INVENTORS
GEORGE L. N. MEYER
ROY H. SPIES
BY John W. Michael
ATTORNEY

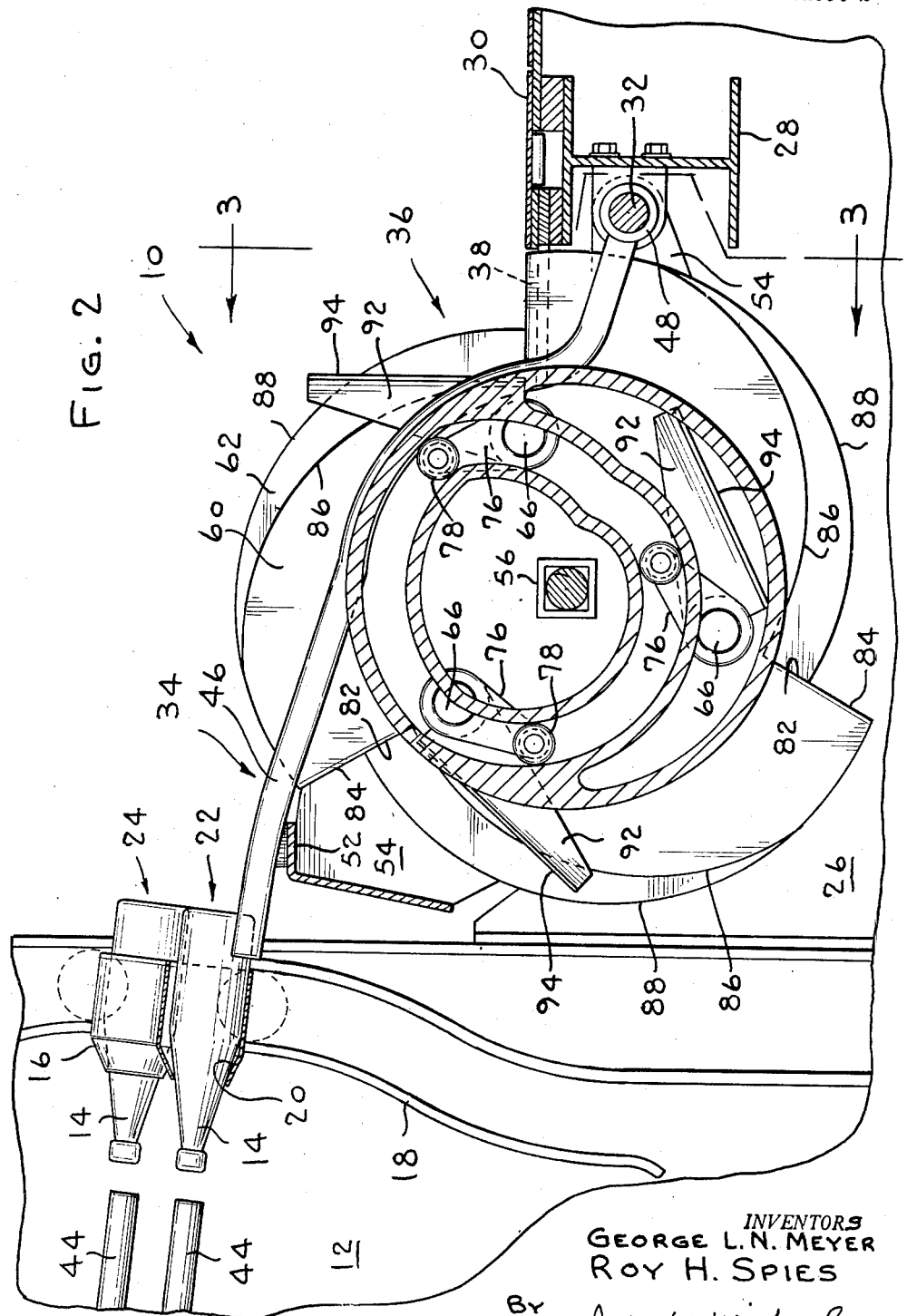

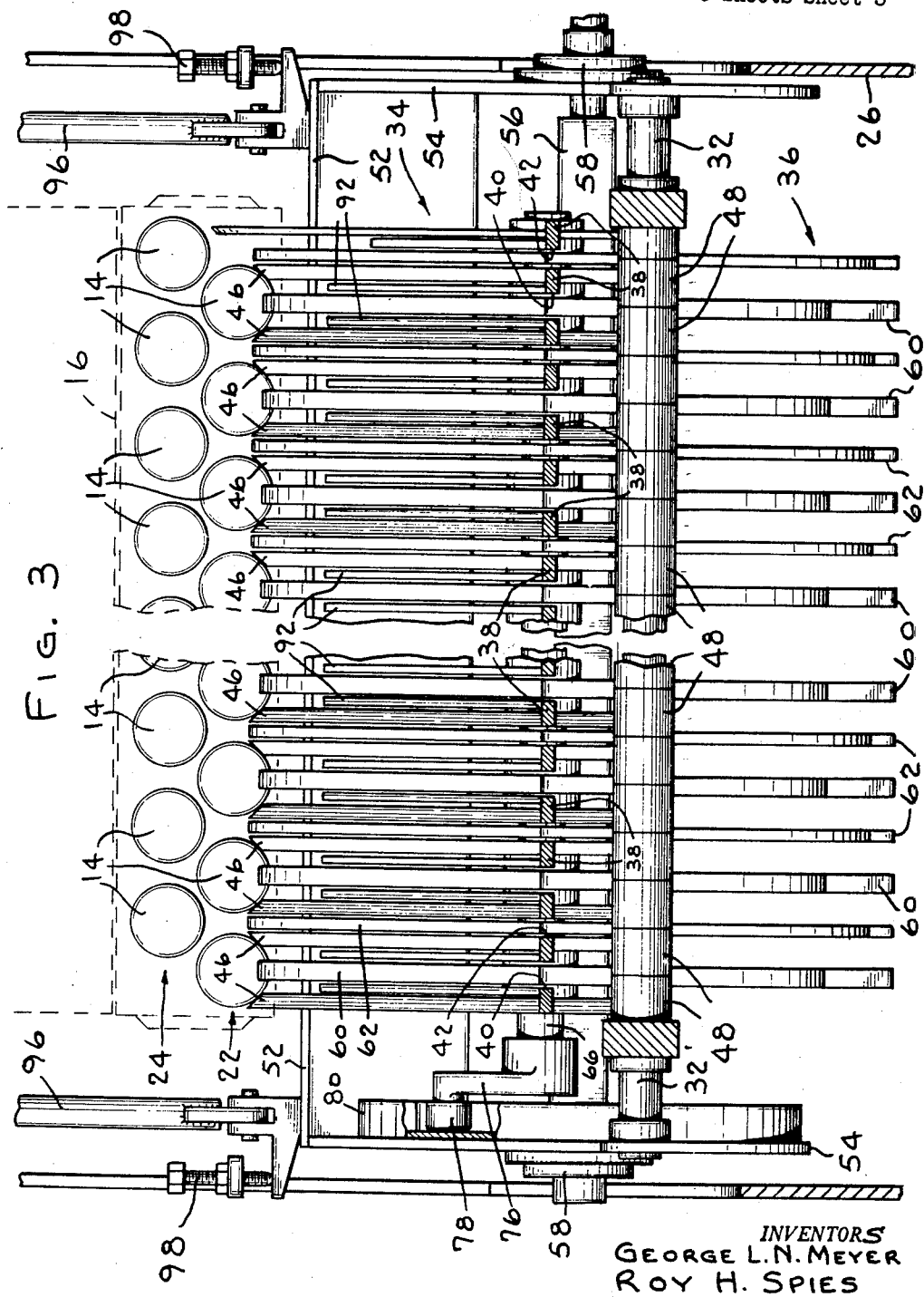

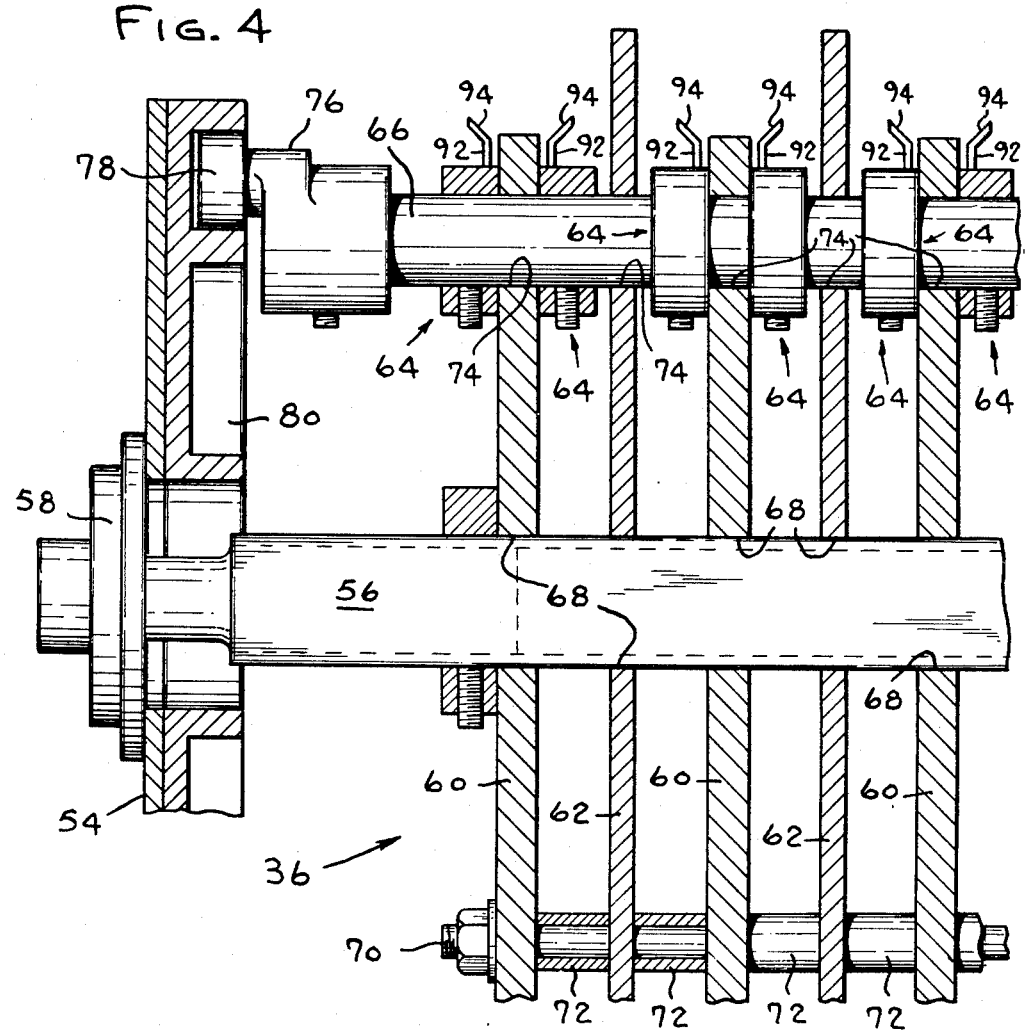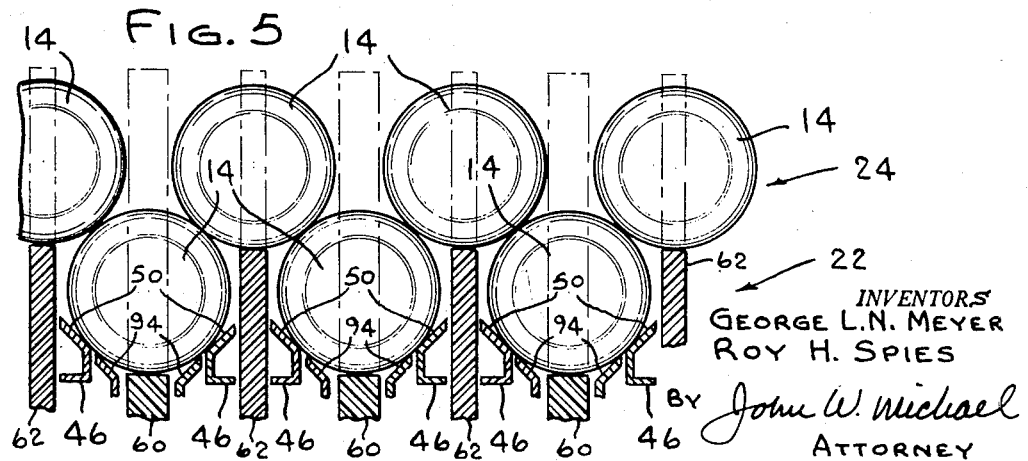

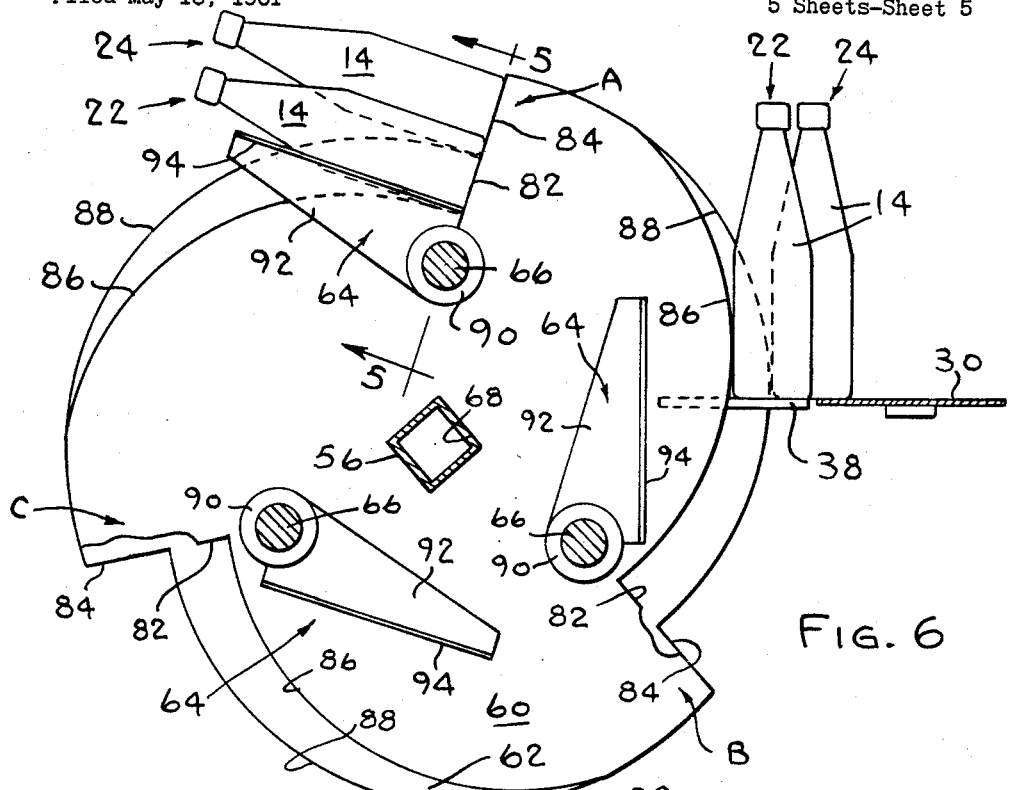
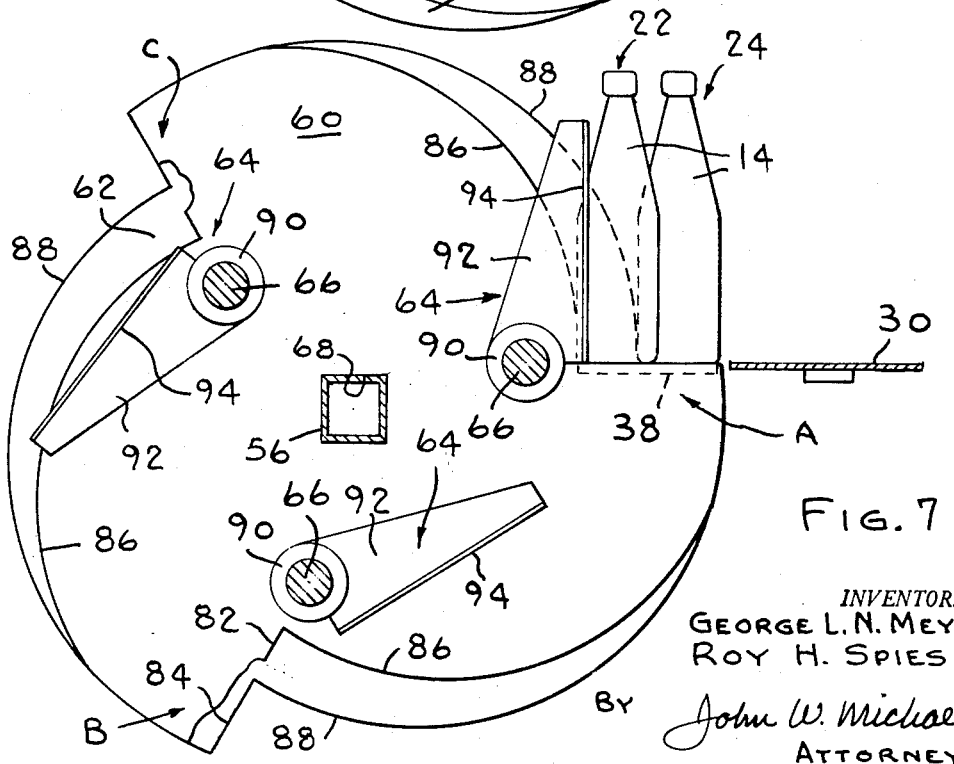

United States Patent Office 3,121,489
Patented Feb. 18, 1964

3,121,489
BOTTLE UNLOADING APPARATUS
George L. N. Meyer and Roy H. Spies, Milwaukee, Wis., assignors to Geo. J. Meyer Manufacturing Co., Cudahy, Wis., a corporation of Wisconsin
Filed May 18, 1961, Ser. No. 111,010
10 Claims. (Cl. 198—25)

This invention relates to apparatus for unloading bottles from a bottle washer.

The primary object of this invention is to provide bottle unloading apparatus for a bottle washer which (together with other novel apparatus referred to hereinafter) provides a machine having a greatly increased capacity over that of prior machines of comparable physical size and bottle carrier speed.

The other apparatus to which this invention relates includes an improved bottle carrier construction covered by applications Serial Nos. 113,852 and 117,656, filed on May 31, 1961, and June 16, 1961, respectively, and an improved bottle loading apparatus covered by application Serial No. 111,008, filed on May 18, 1961.

As explained in said application Serial No. 111,008, the improved bottle unloading apparatus of this invention, together with the improved carrier construction and loader referred to above, provides a bottle washer having a substantially increased capacity and yet can be operated at a reduced number of cycles per minute. This very desirable increased capacity with reduced speed is made possible by the ability of the unloader to simultaneously unload two rows of bottles from the bottle carrier and deposit them on a horizontal surface for removal by a suitable discharge conveyor. As stated above, the bottle unloading apparatus of this invention is adapted to unload two rows of bottles simultaneously. This is accomplished by apparatus which includes a bottle guide means adapted to receive two rows of bottles simultaneously in a substantially horizontal position and a bottle transfer means adapted to transfer the two rows of bottles simultaneously along the guide means for deposit on a horizontal surface.

The bottle transfer means includes a first set of rotatable cam members adapted to support and steady one row of the two rows of bottles thereon and a second set of rotatable cam members adapted to support the second row of bottles arranged in piggy back fashion on the first row of bottles.

The rotatable cam members of both the first and second sets each has a bottle push-off face formed thereon adapted to engage the first and second rows of bottles after they have been deposited on a horizontal surface and push them horizontally along the surface onto a discharge conveyor.

The cams of one of the two sets of rotatable cam members are provided with bottle support members pivotally mounted adjacent the cam members and adapted to engage the sides of the bottles in the first row as the two rows are transferred simultaneously along the guide means for deposit on a horizontal surface. The bottle support members are adapted for controlled movement with respect to the cam members to thereby prevent interference between said support members and the bottles as said cam members continue to rotate after the two rows of bottles are deposited on the horizontal surface.

There are three bottle carrying lobes on each of the first and second sets of cam members which operate to unload a total of six rows of bottles from the bottle washer for each revolution of the rotatable cam members. As stated previously, with the apparatus described above, it is possible to handle a substantially increased number of bottles without increasing the size of the apparatus to any substantial degree and at the same time reducing the speed of the apparatus.

Other objects and advantages will be pointed out in, or be apparent from the specification and claims, as will obvious modifications of the single embodiment shown in the drawings, in which:

FIG. 2 is a sectional view taken along line 2—2 of FIG. 1;

FIG. 3 is a sectional view taken along line 3—3 of FIG. 2;

FIG. 4 is a meandering sectional view taken through the cam transfer assembly shown in FIG. 2;

FIG. 5 is a fragmentary sectional view taken along line 5—5 of FIG. 6; and

FIGS. 6 and 7 are partially schematic views of the apparatus showing the sequence of operation.

Figure 1:
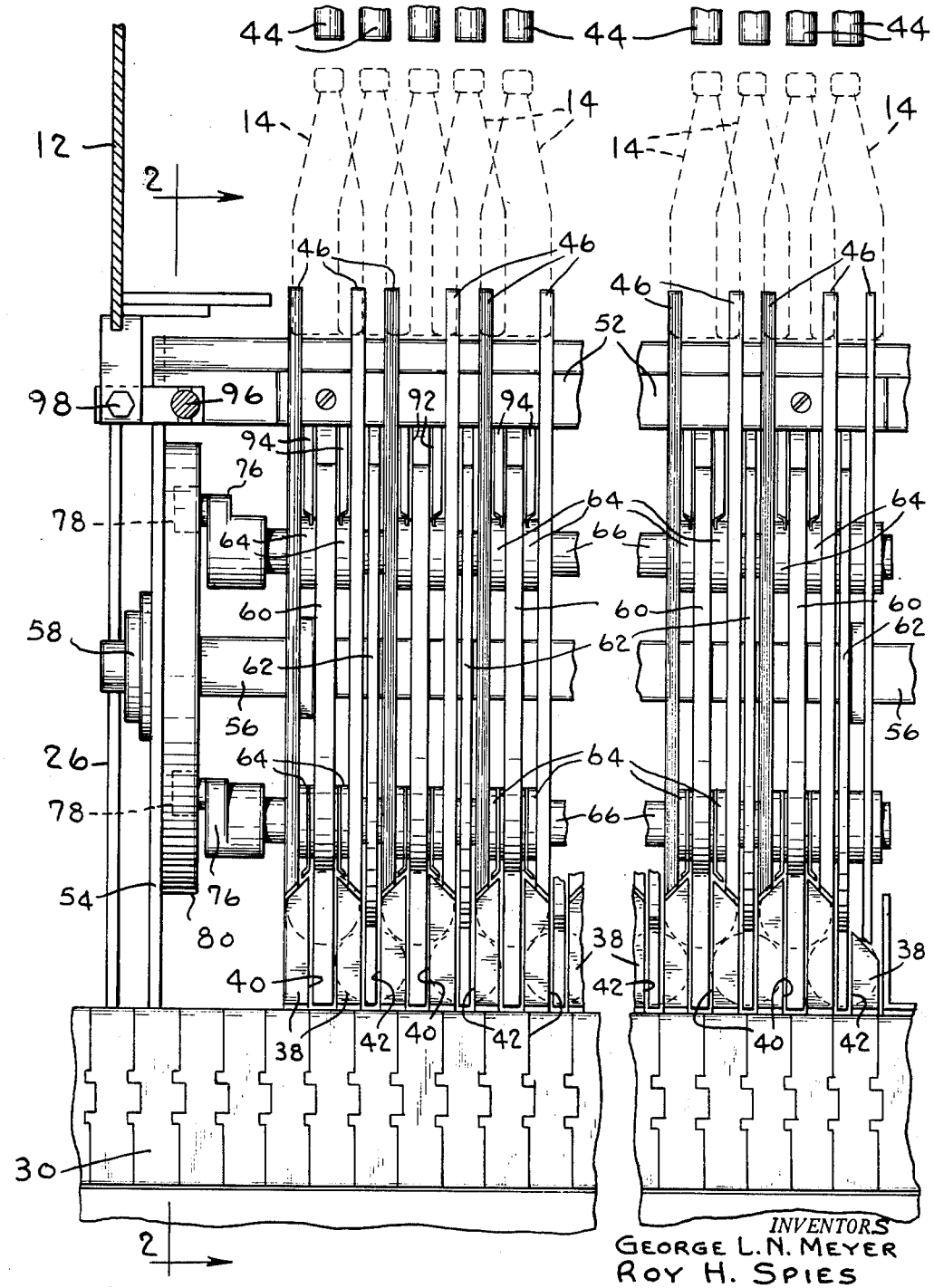
FIG. 1 is a top plan view of the rear portion of a bottle washer provided with a bottle unloading apparatus embodying the present invention.

Referring to the drawings, FIG. 2 shows a piggy back rotary unloader mechanism 10 of this invention mounted at the discharge end of a bottle washer 12. Bottles 14 are loaded into bottle carriers 16 (FIG. 3) at the loading end of the washer and carried through the various stages in the washer by an endless carrier chain moving in tracks 18 (FIG. 2). The bottle pockets 20 of carriers 16 are arranged in tandem relation in banks or rows of up to 40 pockets per row. A carrier of special design having novel features described in detail in application Serial Nos. 113,852 and 117,656 is employed to advance the bottles two rows 22, 24 at a time into an ejection position as shown in FIGS. 2 and 3.

The unloading apparatus 10 of this invention is supported on the discharge end of washer 12 (FIGS. 1 and 2) by a pair of side frames 26 bolted to the washer and having a transverse I-beam 28 supported therefrom. A bottle discharge conveyor chain 30 of conventional design is movably mounted on the top of I-beam support 28. The unloader mechanism is pivotally supported on I-beam 28 by means of a support shaft 32 and includes a bottle guide assembly and a bottle transfer assembly designated generally by numerals 34 and 36, respectively. A stationary bottle slide plate 38 having transverse notches 40, 42 therein (FIG. 1) is mounted adjacent conveyor 30 and adapted to receive bottles deposited thereon by the unloader mechanism as will presently be explained.

As shown in FIGS. 1, 2 and 3, bottles 14 are ejected from the carriers two rows at a time by means of a double row of knockout fingers 44 mounted at the end of a knockout lever (not shown). When the two rows of bottles 22, 24 reach the ejection position (FIG. 2) they are disposed in a substantially horizontal position (about an 18 degree angle with the horizontal). Thus, it is seen that neither prior to ejection nor when ejected do bottles 14 assume a substantially upright position and therefore there is no possibility of water or other material falling into the open ends of the bottles from the carrier chain and bottles above. When the knockout fingers are actuated, two rows of bottles will be ejected simultaneously by the positive engagement of fingers 44 with the bottoms of the bottles and thus the danger of bottles sticking in the carriers is substantially eliminated.

The two rows 22, 24 of bottles 14 which are ejected simultaneously will be received by guide assembly 34 and deposited smoothly and rapidly on slide plate 38 by bottle transfer assembly 36.

The guide assembly 34 includes a plurality of curved bottle slides 46 having hubs 48 at their lower ends for pivotally mounting the slides in a spaced row along support shaft 32. Slides 46 (FIG. 5) have angled leg portions 50 which angle outwardly and cooperate with the next adjacent slide to form V-shaped bottle guides for the lower row 22 of bottles ejected from the carriers. As will be explained in more detail hereinafter, the second or top row 24 of bottles is supported in piggy back fashion on the first row of bottles. The upper ends of slides 46 adjacent the ejection station are supported on a plate 52 fastened between drive shaft bearing plates 54, 54 pivotally mounted on support shaft 32 at each end thereof.

The bottle transfer assembly 36 is rotatably supported on a square drive shaft 56 journaled in bearings 58 mounted in plates 54, 54. Assembly 36 includes a plurality of bottle push-off cams 60 and 62 alternately mounted on drive shaft 56 for rotation therewith. Push-off cams 60 are provided with a plurality of bottle tilter fingers 64 (three to a cam) mounted on three tilter finger shafts 66 and adapted for pivotal movement with respect to the cams. There are no tilter fingers on cams 62. Cams 60 and 62 have square openings 68 therein to insure proper register with the square shaft 56. As shown in FIG. 4, tie rods 70 and spacer tubes 72 are provided to accurately space the cams and tie them together to form a unitary cam bank.

The tilter finger shafts 66 extend through aligned openings 74 in cams 60 and 62 and are equally angularly arranged around drive shaft 56. Tilter finger shafts 66 are actuated by cam levers 76 mounted on the end of each shaft and having cam followers 78 rotatably mounted thereon in engagement with a tilter finger cam 80 mounted on a bearing plate 54.

As shown in FIG. 3, bottle push-off cams 60 and 62 are positioned for rotation in the spaces between bottle slides 46 so that the two rows of bottles ejected onto the guide assembly 34 can be engaged by the cam transfer assembly 36 and transferred to conveyor 30 in a manner to be described in detail hereinafter. Cams 60 and 62 (FIGS. 6 and 7) are provided with three bottle handling lobes A, B and C each formed by radially extending bottle support faces 82 and 84, respectively, and smoothly curved bottle push-off faces 86 and 88, respectively, which in cooperation with the tilter fingers 64 function to transfer two rows of bottles for each lobe or a total of six rows for each complete revolution of the cam assembly.

Bottle tilter fingers 64 comprise a base portion 90 for mounting on shaft 66 and a pair of upright finger portions 92 which lie substantially flush with adjacent cams 60. As shown in FIGS. 4 and 5, the edges 94 of finger portions 92 are bent slightly to adapt the fingers for engagement with the bottles of the first or lower row 22 when ejected onto bottle slides 46. The finger portion 92 of one tilter finger combines with the finger portion of the next adjacent tilter finger to support and steady the bottles in the lower row 22 as they are transferred from the substantially horizontal ejection position to an upright position for deposit on bottle slide plate 38 as will be explained in detail hereinafter.

The cam assembly is rotated as a unit by any suitable means such as a chain drive driven from the main washer drive as described in copending application Serial No. 111,011, filed May 18, 1961. The entire loader mechanism can be pivoted downwardly about shaft 32 when necessary to free a bottle jam, for example, by apparatus such as that shown in said copending application Serial No. 111,011. The unloader mechanism is returned to operating position by a counterweight arrangement (not shown) connected to the mechanism by rods 96 (FIG. 3) which serve to pivot the unloader mechanism upwardly against adjustable stops 98.

*Operation*

The movement of carrier chain 30 is synchronized with the double row of reciprocating knockout fingers 44 so that when two rows of bottles move into the ejection station fingers 44 will be actuated to push two rows of bottles from the carrier onto the V-shaped guides formed by adjacent bottle slide elements 46 of guide assembly 34. As shown in FIG. 5, upon initial ejection of the bottles the lower row 22 of bottles will be supported directly by the slide elements while the second or upper row 24 of bottles will be supported by the lower row of bottles in piggy back fashion with the bottles of the second row being staggered or offset with those of the first row.

The rotation of bottle transfer cam assembly 36 is synchronized with the actuation of the knockout fingers so that as the two rows of bottles are ejected onto the guide assembly 34 the continuously rotating cams 60 and 62 will be properly positioned to receive the bottles.

Referring now to FIGS. 6 and 7, as the two rows of bottles are ejected from the carrier onto the guide assembly, the bottles will be pushed by fingers 44 into the position shown at lobe A in FIG. 6 wherein the bottoms of the lower row 22 of bottles will engage bottle support faces 82 of cams 60 and the bottoms of the bottles in the upper row 24 of bottles will engage bottle support faces 84 of cams 62. At the same time a pair of support edges 94 of a pair of adjacent bottle tilter fingers 64 will engage the sides of the lower row 22 of bottles. In the FIG. 6 position the tilter finger cam 80 has positioned the tilter fingers 64 engaging the bottles at lobe A so that edges 94 will extend at right angles with respect to the bottle support faces 82 and 84 which engage the bottoms of the bottles. As cams 60 and 62 are rotated clockwise (as shown by the arrow), from the position shown in FIG. 6 to that shown in FIG. 7, the right angle relationship between edges 94 and faces 82 and 84 will be maintained to thereby smoothly tilt the two rows of bottles from their substantially horizontal ejection position to an upright position for deposit on the horizontal bottle slide plate 38. It will be noted that during this bottle tilting movement the bottles of the lower row 22 do not normally contact slide elements 46 but instead are supported by surfaces 82 and tilter finger edges 94 (bottles of upper row 24 are supported by surfaces 84 and the sides of the bottles in the lower row). The bottom portions of the lower row 22 of bottles remain in the troughs formed by bottle slides 46 to thereby insure bottle stability at all times.

As cams 60 and 62 continue to rotate, bottle push-off cam faces 86 and 88, respectively, will engage the two rows of bottles (through notches 40 and 42 in the bottle slide plate 38) and push them horizontally from the bottle slide plate onto discharge conveyor chain 30. Cam faces 86 and 88 are formed so that there will be a short dwell time after the bottles are deposited on the slide plate and before they are pushed off onto chain 30 to thereby allow the bottles to come completely to rest in case they may be rocking slightly upon initial deposit on the horizontal surface.

It will be appreciated that as cams 60 and 62 continue to rotate after deposit of the two rows of bottles on the slide plate by lobe A it is necessary to pivot tilter fingers 46 with respect to the cams to prevent interference between the tilter fingers and the bottles deposited on plate 38. This is accomplished by designing tilter finger cam 80 to actuate tilter finger levers 76 and thereby rotate the tilter fingers 46 (clockwise with respect to the cams) from a right angle position to a position (lobe B, FIGS. 6 and 7) whereby they lie at an angle greater than 90 degrees with respect to support faces 82, 84 as the tilter fingers pass downwardly beneath the level of the plate 38. The rate of tilter finger rotation is such that as the fingers move downwardly past the bottles on slide plate 38 the edges 94 of the tilter fingers will remain at substantially right angles to the slide plate and thereby provide an upright back support for the bottles in case they, for any reason, would be tipped backwards during the dwell period after deposit on the plate.

It is seen from the foregoing that by use of alternately spaced cams 60 and 62 and tilter fingers 64 it is possible to receive two rows of bottles ejected simultaneously from the carrier and support and transfer such bottles from the horizontal ejection position to an upright position on plate 38.

Although but one embodiment of the present invention has been illustrated and described, it will be apparent to those skilled in the art that various changes and modifications may be made therein without departing from the spirit of the invention or from the scope of the appended claims.

We claim:

1. Bottle handling apparatus comprising, bottle guide means adapted to receive two rows of bottles simultaneously in a substantially non-vertical position, and bottle transfer means adapted to transfer the two rows of bottles simultaneously along said guide means for deposit on a horizontal surface, said bottle transfer means including a first set of rotatable cam members adapted to support and steady one row of the two rows of bottles, and a second set of rotatable cam members adapted to support a second row of bottles arranged in piggy back fashion on the first row of bottles.

2. Bottle handling apparatus according to claim 1 in which each of said rotatable cam members of said first and second sets has a bottle push-off face formed thereon adapted to engage the first and second rows of bottles after deposit on the horizontal surface and push them horizontally along the surface.

3. Bottle handling apparatus for unloading rows of bottles from a bottle washer and depositing the rows on a horizontal surface comprising a first set of rotatable cam members, a second set of rotatable cam members, each of said first set of cam members having a first and second support face adapted to engage the bottom and side of a bottle respectively to support a first row of bottles thereon, said second set of rotatable cam members each adapted to support a second row of bottles arranged in piggy back fashion on top of the first row of bottles so that when said first and second sets of cam members are rotated two rows of bottles will be transferred simultaneously from a bottle washer to a horizontal surface.

4. Bottle handling apparatus according to claim 3 in which said second support faces of said first set of cam members is adapted for movement with respect to said first support faces to thereby prevent interference between said second support faces and the bottles as said cam members continue to rotate after two rows of bottles are deposited on a horizontal surface.

5. Bottle handling apparatus comprising bottle guide means adapted to receive two rows of bottles simultaneously in a substantially non-vertical position, bottle transfer means adapted to support and steady the two rows of bottles and transfer the two rows simultaneously along said guide means for deposit on a horizontal surface, said bottle transfer means including a first and second set of rotatable cam members which cooperate to support and steady two rows of bottles as they are transferred simultaneously along said guide means, said bottle transfer means further including a bottle support member for each of said first set of rotatable cam members, said bottle support members pivotally mounted adjacent said first set of rotatable cam members and adapted to engage the sides of the bottles in one of the two rows.

6. Bottle handling apparatus according to claim 5 in which there are three bottle carrying lobes on each of said first and second sets of cam members adapted to unload a total of six rows of bottles from the bottle washer for each revolution of said first and second sets of rotatable cam members.

7. Bottle handling apparatus according to claim 5 in which said first and second sets of rotatable cam members are alternately spaced along a common shaft and are adapted to support two rows of bottles with one of the rows positioned in piggy back fashion on top of the other row.

8. Bottle handling apparatus according to claim 5 in which each of said rotatable cam members of said first and second sets has a bottle push-off face formed thereon adapted to engage the two rows of bottles after deposit on a horizontal surface and to push them horizontally along the surface.

9. Bottle handling apparatus according to claim 5 in which the bottle transfer means further includes a stationary bottle support member cam and a bottle support member shaft on which said bottle support members are mounted, said bottle support cam adapted to rotate said bottle support member shaft as said rotatable cam members are rotated to thereby maintain the proper relative position between said bottle support members and said first set of rotatable cam members.

10. Bottle handling apparatus for unloading rows of bottles from a bottle washer and depositing the rows on a horizontal surface comprising a plurality of rotating members adapted to receive two rows of bottles simultaneously from a bottle washer and to then deposit the two rows in upright position on a horizontal surface, said rotating members arranged side-by-side on a common shaft and positioned to support and transfer the first row of bottles directly thereon and a second row of bottles in piggy-back fashion on the first row of bottles.

References Cited in the file of this patent

UNITED STATES PATENTS

| | | |
|---|---|---|
| 2,738,866 | Vamvakas | Mar. 20, 1956 |
| 2,859,929 | Vamvakas | Nov. 4, 1958 |